United States Patent [19]

Stugart

[11] 4,363,249
[45] Dec. 14, 1982

[54] SAFETY APPARATUS FOR VEHICLES HAVING AUTOMATIC TRANSMISSIONS

[76] Inventor: Jerald L. Stugart, P.O. Box 1447, Greeley, Colo. 80632

[21] Appl. No.: 164,252

[22] Filed: Jun. 30, 1980

[51] Int. Cl.³ .................. F02N 15/10; B60K 28/00; G08B 21/00
[52] U.S. Cl. .................................... 74/850; 180/272; 192/4 A; 200/61.88; 200/61.91; 340/52 R
[58] Field of Search .................. 74/850; 192/4 A; 180/272; 340/52 R, 686; 200/61.88, 61.91; 123/179 K, 198 D

[56] References Cited

U.S. PATENT DOCUMENTS

| | | | |
|---|---|---|---|
| 2,431,117 | 11/1947 | Hadley | 200/61.91 X |
| 3,381,269 | 4/1968 | Fierbaugh et al. | 340/52 R |
| 3,439,324 | 4/1969 | Kirimoto et al. | 340/52 R X |
| 4,250,486 | 2/1981 | Kiefer et al. | 340/52 R |

Primary Examiner—Alan D. Herrmann
Attorney, Agent, or Firm—Horace B. Van Valkenburgh

[57] ABSTRACT

A neutral safety switch is moved to a closed position upon shifting of an automatic transmission to a neutral position but moved to an open position when the automatic transmission is shifted to a drive position. An air pressure responsive switch is moved to a closed position when air brake pressure is reduced to set alternative brakes and is in series with a bell, buzzer, light or other signal producing device. A control device is controlled by the neutral safety switch, so as to close one circuit, whereby an ignition control may be utilized to start the engine with the transmission in neutral position, but to close an alternative circuit, whereby the signal device will be activated with the alternative brakes set, when the neutral safety switch is moved to open position.

8 Claims, 4 Drawing Figures

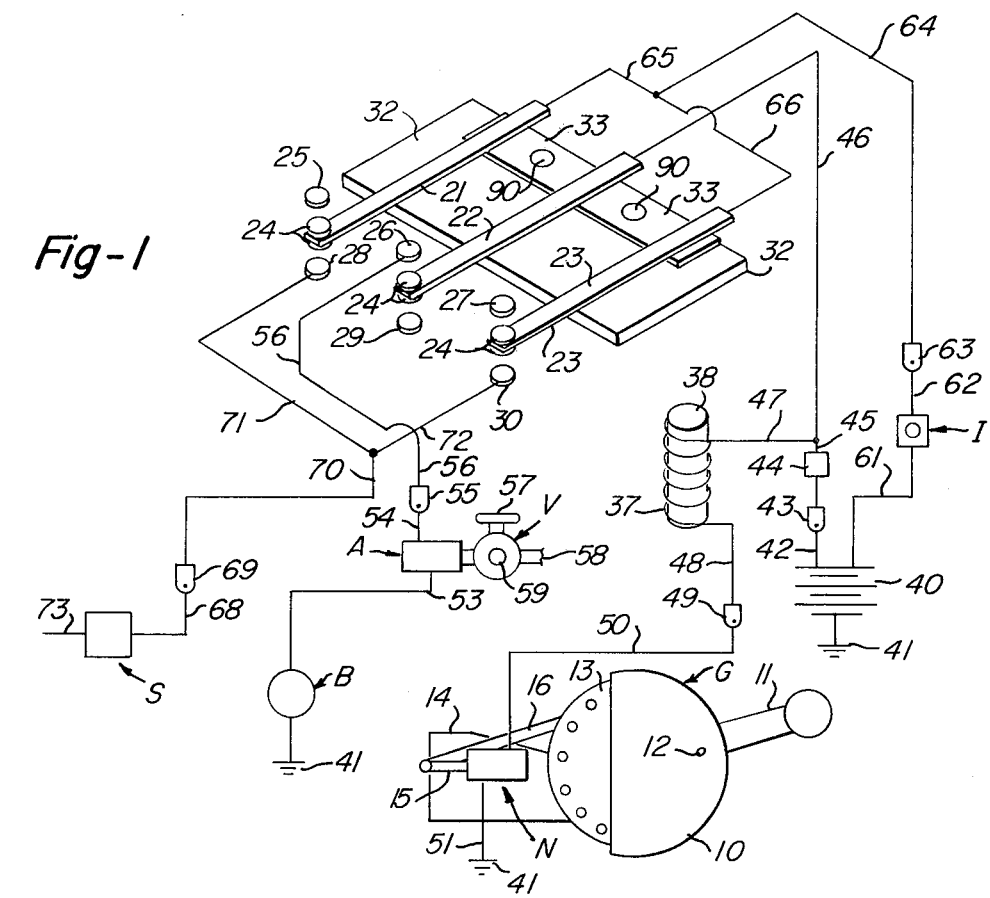
Fig-1
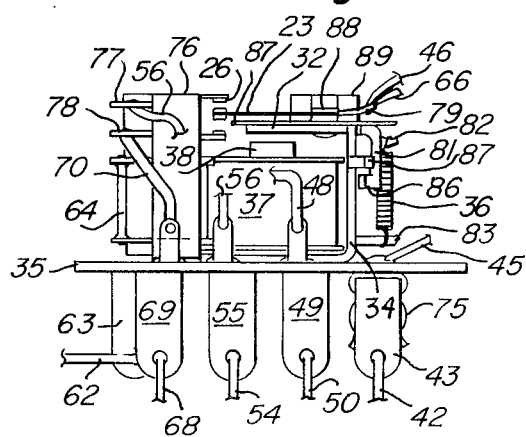
Fig-2
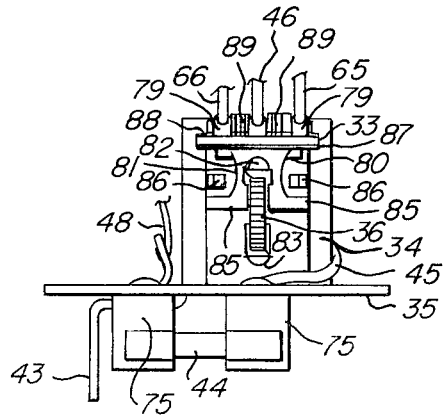
Fig-3
Fig-4

SAFETY APPARATUS FOR VEHICLES HAVING AUTOMATIC TRANSMISSIONS

This invention relates to safety apparatus for vehicles having automatic transmissions, particularly trucks or tractors drawing trailers, and more particularly such safety apparatus which will produce an alarm signal when the automatic transmission is accidentally shifted from neutral when the alternative brakes, which set when air brake pressure becomes low, are used for parking purposes.

BACKGROUND OF THE INVENTION

Automatic transmissions may be damaged when the transmission is operated in the drive range for any length of time, but the vehicle is not moving due to the brakes, such as brakes used for parking, being set. A neutral safety switch has been used in conjunction with an automatic transmission, being placed in series with the ignition, so that the ignition switch or the starter button cannot be activated to start the engine, unless the transmission is in neutral. Thus, a conventional neutral safety switch is moved to a closed position when the transmission is in neutral, but is moved to an open position when the handle or lever of the transmission is shifted to place the transmission in a drive position, either forward or reverse. Devices have also been utilized which move the transmission to a neutral position through a hydraulic device when one or two brake pedals for actuating the air brakes are pushed. One such brake pedal is utilized when a small reduction in speed is desired which does not require a shift of the transmission. However, when the truck or a tractor and its trailer are to be braked to a full stop, it is highly desirable that the transmission be automatically placed in neutral to permit the full effectiveness of the brakes to be utilized. Thus, such hydraulic device is activated by some type of interlock between the brake pedal utilized to bring the truck or tractor and trailer to a full stop, and the hydraulic device which automatically pushes the transmission to a neutral position usually acting upon a handle or lever by which the transmission is shifted. An example of such a device is shown in U.S. Pat. No. 4,063,624. However, such a system is quite expensive and is not particularly useful for any other purpose, since the transmission would be shifted into neutral only if one of the air brake pedals is pushed.

It often happens that the driver of a truck or tractor pulling a trailer wishes to stop for a meal, or rest or sleep, as in a bunk behind the seats of the cab. Normally, the gear shift for an automatic transmission is located between the two front seats with which the cab is normally equipped, and the handle of the transmission may be accidentally struck, as by a foot of the driver when crawling into the bunk. Since air pressure must be maintained for the normal brakes to be engaged, it is customary for the driver to release the air pressure by a valve and rely on the springs which automatically engage the brakes, when air pressure is low, to maintain the brakes in position for parking purposes. Also, the engine is normally kept running in cold weather to maintain warmth in the cab and also to obviate the problems of starting an engine which has been stopped for one or more hours in cold or very cold weather. Since the engine is idling, there is enough power transmitted to the transmission to move the truck or tractor and trailer, if the transmission is accidentally shifted into a drive position due to the spring pressed brakes which are utilized as emergency brakes, in the event of failure of air. Thus, the driver may unknowingly move the gear shift handle into a drive position when leaving the cab or crawling into the bunk and learn only later that the transmission has been severely damaged through the continued running of the engine and no movement whatever of the truck or tractor trailer.

Among the objects of this invention are to provide safety apparatus which will make the driver aware of an automatic transmission having been accidentally shifted into a drive position when the engine is continued running at idling speed and the emergency brakes are used as parking brakes; to provide such apparatus which will produce an alarm signal, such as a buzzer, bell, horn, light or the like, to indicate to the driver that the transmission has been shifted out of neutral; to provide such apparatus which utilizes a conventional neutral safety switch but which will not adversely affect the normal function of the neutral safety switch in permitting the ignition switch or starter button to be utilized in starting the engine only when the transmission is in neutral; to provide such apparatus which is very reasonable in cost and may be installed with ease and facility; to provide such apparatus which includes a switch which is responsive to low air pressure in the air brake line; and to provide such apparatus which is reliable as well as simple in construction and effective in operation.

SUMMARY OF THE INVENTION

The safety apparatus of this invention, for a truck or tractor having an automatic transmission, air brakes and alternative brakes which set when the air brake pressure is reduced to a predetermined value, for producing a signal when the transmission is shifted away from neutral while the engine is running for an extended period of time and such alternative brakes are used for parking purposes, includes a neutral safety switch which is moved to a closed position upon shifting of the automatic transmission to a neutral position, but moved to an open position when the automatic transmission is shifted to a drive position, a pressure responsive switch which is moved to a closed position when air brake pressure is reduced to such predetermined value, a device for producing a signal and connected in series with the air pressure responsive switch, and a device controlled by the neutral safety switch for causing current to be supplied to the air pressure switch and the signal producing device when the neutral safety switch is moved to an open position. The latter device may also be constructed and arranged so that the normal function of the neutral safety switch in association with an ignition control, such as a switch or a starter button, may be utilized to prevent starting of the engine unless the transmission is in neutral. The preferred control device is a multiple contact, multiple blade magnetic switch, such as having upper and lower switch contacts for each blade, as well as a pivoted magnetic plate on which the switch blades are mounted and a coil which pulls the magnetic plate and the switches along with it, as against the pressure of a spring, to move the switch blades from one series of contacts to the opposite contacts. The neutral safety switch is connected in series with the magnetic coil, so that when the coil is energized with the neutral safety switch in closed position and the transmission thereby neutral, one or more of the blades may supply current from the ignition switch or starter button to a starter solenoid or series parallel starter connection. The current for passage through the low air pressure switch to the alarm device is supplied through a different blade than is utilized for ignition purposes; thus, such blade engages an opposite contact to activate the alarm when the transmission is shifted from neutral, and the neutral safety switch thereby opens, causing the spring to shift the magnetic plate and the switch blades to the opposite contacts.

THE DRAWINGS

Additional objects and other novel features of this invention will become apparent from the description which follows, taken in conjunction with the accompanying drawings, in which:

FIG. 1 is a diagrammatic representation of the apparatus of this invention.

FIG. 2 is a side view, on a reduced scale and in outline only, showing particularly the relative locations of a seat, a bunk and a gear shift.

FIG. 3 is a side elevation of a control device of the apparatus.

FIG. 4 is a rear elevation of the control device of FIG. 3.

DESCRIPTION OF THE PREFERRED EMBODIMENT

Safety apparatus for trucks with automatic transmissions, constructed in accordance with this invention and as illustrated in the drawing, may include a control device C, conveniently a triple double contact magnetic relay switch, such as Model R129 of the Murphy Switch Company of Tulsa, Okla. A particularly relevant portion of control device C is shown in FIG. 1, which is connected in such a manner that an ignition control I, such as a switch or starter button, may be turned or moved to an on position and will cause a starter solenoid S to start the engine only if a neutral safety switch N associated with a gear shift G is in a position corresponding to the gear shift being in neutral. While the foregoing is the normal function of the neutral safety switch N, it being noted that after the engine is running, shifting of the gear shift out of neutral will not cause the engine to stop, the device of this invention is further associated with a low air pressure switch A which is responsive to the low pressure of air when the brake air is released by an air brake valve V to cause the emergency spring brakes to set, being relied on for parking purposes, in order to cause a buzzer B or other alarm, such as a horn, bell, light, etc., to be energized without in any way affecting the starting function. The gear shift G may include a housing 10 in which a handle 11 is mounted on a pivot 12 to turn a disc 13 in a conventional manner. The safety neutral switch N, which is conventional and has a closed position when the transmission is is neutral, is mounted on a flange 14 of the housing and has a plunger 15 which is pivotally connected by a link 16 to disc 13, to which link 16 is also pivotally connected to shift the neutral safety switch N to a closed position when the handle 11 is in a position corresponding to the neutral position of the transmission but will be open when the handle 11 and disc 13 are in any other position, in either direction, such as a forward drive position or a reverse drive position.

One seat 19 and a bunk 20 in the cab are illustrated in outline in FIG. 2, with the gear shift G at one side of the seat 19, e.g. between the two seats with which the cab is usually provided. The gear shift handle 11 is shown in the neutral position. The driver who wishes to rest or sleep in the bunk 20 during cold weather, leaves the engine running to maintain heat, shifting the handle 11 to neutral position as the truck is stopped. In order to reduce the fuel used by maintaining air pressure on the brakes, the driver will shift the air brake valve V to an appropriate conventional position to reduce the supply of air which normally overcomes the pressure of the emergency springs which apply the brakes in the event that the air pressure fails. In climbing from the seat 19 to the bunk 20, it is very easy for the driver to accidentally hit the handle 11 with a foot and, both unknowingly and unwittingly, shift the handle 11 to a drive position, either forward or reverse. Since the engine will continue to idle, but the spring applied brakes will keep the truck from moving, there will normally be no way in which the driver will become aware of the impending ruin to the transmission. The buzzer B is preferably placed in a position in which it can be readily heard by the driver, such as directly above the bunk. Or, a bright lamp may be substituted which, when placed over the bunk, will also tend to attract the attention of the driver.

The control device C, as in FIG. 1, includes three switch blades 21, 22 and 23, each having a double contact 24 at the front or outer end adapted to engage a corresponding upper contact 25, 26 or 27 when the outer ends of the blades are moved upwardly, or a corresponding lower contact 28, 29 or 30 when the outer ends of the blades are moved downwardly. Blades 21, 22 and 23 are mounted in spaced position on a magnetic plate 32 and insulated therefrom, as by an insulating bar 33 and other insulation described later. In general, the rear of magnetic plate 32 is pivotally mounted on a post 34 of FIG. 3, in turn mounted on a base 35 of control device C which is formed of insulating material, while the magnetic plate and blades are held by a spring 36 in a position in which the blade contacts 24 engage the upper contacts 25, 26, 27, until the magnetic plate 32 is pulled down by energization of a coil 37 having a core 38.

Suitable current may be supplied by a battery 40 connected at one side to a ground 41 and, at the other, through a wire 42 to a tab 43 on base 35, in turn connected to a fuse 44. A wire 45, leading from the fuse, connects at a position shown to a first branch wire 46, which is connected to the inner end of central blade 22, and a second branch wire 47 which is connected to one side of coil 37. From coil 37, a wire 48 leads to a tab 49, also mounted on base 35 and in turn connected by a wire 50 with one side of the neutral safety switch N, the oppsite side of which is connected by a wire 51 to ground. One side of buzzer B may be connected to ground, as shown, while the other side is connected by a wire 53 with one side of low air pressure switch A, the opposite side of which is connected by a wire 54 with a tab 55, also mounted on base 35. From tab 55, a wire 56 extends to the center upper contact 26, it being noted that upper contacts 25 and 27 are not used in the preferred embodiment. Thus, if coil 37 is deenergized because neutral safety switch N is opened, when handle 11 is shifted to a drive position of the transmission, current will be supplied through branch wire 46 to center blade 22, then through contacts 24, 26 and wires 56, 54 to closed low air pressure switch A, which is in closed position through closure of valve V having a handle 57 and air connectors 58 and 59. From switch A, current is supplied through wire 53 to buzzer B or other suitable type of alarm device.

One side of ignition control I is supplied with current from battery 40 by a wire 61, while the other side is connected by a wire 62 with a tab 63 mounted on base 35, from which a wire 64 leads to a junction with branch wires 65 and 66 which are respectively connected to the rear ends of outer blades 21 and 23. Similarly, starter solenoid S is connected at one side by a wire 68 to a tab 69 on base 35. From tab 69, a wire 70 leads to a junction with branch wires 71 and 72 which are connected to lower outer contacts 28 and 30, respectively, lower center contact 29 not being used. From the other side of solenoid S, a wire 73 leads to the starter. As will be evident, with gear shift handle 11 in a neutral position, neutral safety switch N will be closed and coil 37 will thereby be energized, so that contacts 24 of blades 21 and 23 will engage outer lower contacts 28 and 30, respectively, and current will flow to starter solenoid S, thereby starting the motor. As will be evident, as long as gear shift handle 11 remains in neutral position, coil 37 will remain energized and buzzer B, or other type of signal device, cannot receive current. Although after the engine has started, it is immaterial whether neutral safety switch N remains closed or is opened, as far as the starter solenoid S is concerned, it is quite material in the event that low air pressure switch A is closed, since opening of neutral safety switch N will cause coil 37 to be deenergized and the pull of spring 36 of FIGS. 3 and 4 will cause magnetic plate 32 to be pivoted upwardly, thereby causing contact 24 of blade 22 to engage upper center contact 26 and actuate buzzer B or other alarm.

As in FIGS. 3 and 4, other parts of the preferred control device C include a fuse holder 75 for fuse 44 and to which wire 45 is connected, as well as a standard 76 of insulating material, opposite post 34 and on which the upper contacts 25, 26, 27 are mounted, as on a series of tabs 77 which also extend through the standard. Wire 56, which extends from lower tab 55 and a portion of which is omitted for clarity of illustration, connects with center tab 77 for upper center contact 26, as shown in FIG. 3. Also, wire 70 through its branch wires 71 and 72 (not shown in FIG. 3) extends to individual tabs 78 for lower outer contacts 28 and 30, respectively. The rear ends of blades 21, 22, 23 are provided with tabs 79 for connection of wires, wire 46 being connected to the center tab and branch wires 65 and 66 being respectively connected to the outer tabs, as in FIG. 4. Although not shown for clarity of illustration of other parts, wire 66 extends from wire 64 through standard 76 and to a tab 79 on one side of the control device, while wire 65 extends in a similar manner on the opposite side of the device. Wire 48 extends from coil 37 to tab 49, on one side of the control device, while wire 45 extends on the opposite side of the device to a junction with wires 46 and 47, each of which extend through standard 76, with wire 46 extending to a tab 79 on center blade 22 and wire 47 extending to the opposite side of coil 37.

Magnetic plate 32 rests in a slot in the upper end of post 34, the width of the slot in the post being equal to the distance between a pair of ears 80 which extend laterally to each side of the slot at the rear. Between ears 80, a rear leg 81 extends downwardly, having a rearwardly extending hook 82 adjacent its upper end, to which the upper end of spring 36 is attached. A lower hook 83 extends rearwardly from post 34 for attachment of the lower end of spring 36. A stop 85 at each side extends outwardly from the lower end of rear leg 81 of plate 32, while cooperating ears 86 extend rearwardly from post 34 at appropriate positions. An additional insulation layer 87 covers magnetic plate 32, as in FIG. 3, and extends beyond it both forwardly and laterally, while an insulation bar 88 extends across blades 21, 22, 23, opposite insulation bar 33. A pair of insulation blocks 89, which may be integral with bar 88, extend upwardly between the switch blades 21, 22, 23, respectively, to accommodate rivets or the like, extending through holes 90 in insulation bar 33 of FIG. 1, to attach the switch blades, as well as bars 33 and 88 and layer 87, securely to the magnetic plate 32.

During use of the apparatus of this invention, assuming that the handle 11 of the gear shift G is in neutral position, the neutral safety switch N will be closed and coil 37 will be energized. Thus, the magnetic plate 32, and the switch blades 21, 22 and 23 along with it, will be drawn downwardly to the lower position in which contacts 24 of the blades will engage the lower contacts 28, 29 and 30, respectively. Since center lower contact 29 is not used, the outer lower contacts 28 and 30 are of importance. Thus, when the ignition control I is actuated, either through turning the switch or operating a starter button, current will be supplied through wire 68 and branch wires 65, 66 through blades 21 and 23, respectively, thence through wires 71 and 72 to wire 70 and, in turn, wire 69 to starter solenoid S, from which current will flow through wire 73 or a series of wires to the starter. The use of two switch blades for starting purposes is of particular value when a starter button is utilized and a series parallel wound starter is utilized, since all of the current for operating the starter motor is supplied through the starter button and solenoid. In the event that the handle 11 of the gear shift is not in neutral position, neutral safety switch N will be open and coil 37 will be deenergized, so that spring 36 of FIGS. 3 and 4 will maintain switch blades 21, 22 and 23 in an upper position. Thus, neither the ignition switch or starter button of ignition control I can be utilized to start the engine. However, after the engine has been started and the truck or tractor and trailer have been driven to a desired destination during the time that the transmission is in drive position, the neutral safety switch N will be in open position, the coil 37 deenergized and the blades 21, 22 and 23 will engage the respective upper contacts 25, 26 and 27. During such driving, the air brake pressure will be maintained, since the brakes will be utilized for normal driving purposes. However, in the event that the driver wishes to eat or to rest or sleep, as in the bunk 20 behind the seat of FIG. 2, and the weather is sufficiently cold that the engine should be kept running, the driver will stop the truck or tractor and trailer, then shift the transmission to a neutral position and turn the handle 57 of air valve V to shut off the supply of air to the air brakes, which will result in the automatic engagement of the brakes by the springs provided for emergency purposes, but utilized in this instance as parking brakes. As long as the gear shift handle 11 remains in neutral position, the neutral safety switch N will remain in closed position and coil 37 will be energized, so that blades 21, 22 and 23 will be maintained in engagement with the lower contacts 28, 29 and 30. However, if the handle 11 is accidentally moved, as by being struck with the foot of the driver in leaving the cab or climbing over the seat into the bunk 20, the neutral safety switch N will be shifted from closed to open position. Thus, the coil 37 will be deenergized and spring 36 of FIGS. 3 and 4 will then pull the magnetic plate 32 and the blades 21, 22, and 23 to an upper position in which the contact 24 at the outer end of center blade 22 will engage the upper contact 26. Through wires 42, 45, 46, blade 22, contact 26, wires 56, 54 and air pressure switch A, which will be closed through low air pressure produced when the alternative spring actuated brakes are utilized for parking, current will be supplied through wire 53 to buzzer B or other signal device, such as a bell, horn, light or the like. This alarm will alert the driver to the fact that the transmission has been shifted out of neutral, and the driver can then return the handle 11 to the neutral position and continue the desired rest or sleep without interruption from the alarm, or return to the cab and return handle 11 to neutral position.

The apparatus of this invention may be adapted for a truck or tractor having a neutral safety switch interlock with the ignition control, but hydraulic brakes and a hand operated parking brake which tightens a band on the drive shaft. Such adaptation may be made by mounting a normally open switch in such a manner as to be closed when the hand brake is set and substitute such hand brake switch for the low air pressure switch A of the circuit as shown. Such a modified circuit will operate in essentially the same manner as described, with closure of the switch associated with the hand brake permitting current to be supplied to the alarm, such as buzzer B, when the safety neutral switch N is opened by the gear shift handle 11 being moved from neutral position. Thus, coil 37 will be deenergized to permit magnetic plate 32 and blades 21-23 to be moved away from coil core 38 by spring 36, so that contact 24 of switch blade 22 will engage upper center contact 26.

Although a preferred embodiment of this invention has been illustrated and described, it will be understood that other embodiments may exist and that various changes in the apparatus of this invention may be made, all without departing from the spirit and scope of this invention.

What is claimed is:

1. Safety apparatus for a truck or tractor having an engine, an automatic transmission, air brakes and alternative brakes which set when air brake pressure is reduced to a predetermined value, for producing a signal when such transmission is shifted away from neutral while the engine is running for an extended period of time and such alternative brakes are utilized for parking purposes, comprising:
   a neutral safety switch which is moved to a closed position upon shifting of the automatic transmission to a neutral position but moved to an open position when the automatic transmission is shifted to a drive position;
   an air pressure responsive switch which is moved to a closed position when air brake pressure is reduced to said predetermined value;
   means for producing a signal and connected in series with said air pressure responsive switch;
   current supply means; and
   means controlled by said neutral safety switch for causing current to be supplied to said air pressure switch and said signal producing means when said neutral safety switch is moved to an open position.

2. Safety apparatus as defined in claim 1, wherein:
   said means for producing a signal includes a bell, buzzer, horn or light.

3. Safety apparatus as defined in claim 1 wherein:
   said truck or tractor is provided with an ignition control and a starter means;
   said ignition control is electrically connected to said starter means and to said means controlled by said neutral safety switch; and
   said means controlled by said neutral safety switch is constructed and arranged for causing current to be supplied to said starter only when said neutral safety switch is in closed position.

4. Safety apparatus as defined in claim 3, wherein:
   said means controlled by said neutral safety switch includes multiple double contact switch blades movable to opposite positions; and
   said signal producing means is activated only when said switch blades are in one of said opposite positions; and
   said ignition control activates the starter only when the switch blades are in the other of said opposite positions.

5. Safety apparatus as defined in claim 4, including:
   a movable magnetic plate on which said switch blades are mounted; and
   an electromagnetic coil for moving said magnetic plate and said switch blades, said coil being energized when said neutral safety switch is in closed position.

6. Safety apparatus as defined in claim 5, wherein:
   the connection between the current supply and said air pressure responsive switch and signal producing means is through different blades and in a different position of said blades, than the connection between said ignition control and said starter means.

7. Safety apparatus as defined in claim 6, wherein:
   the connection between said ignition control and said starter means is through a plurality of switch blades.

8. Safety apparatus as defined in claim 5, including:
   resilient means for urging said plate and blades to one of said opposite positions.

* * * * *